UNITED STATES PATENT OFFICE.

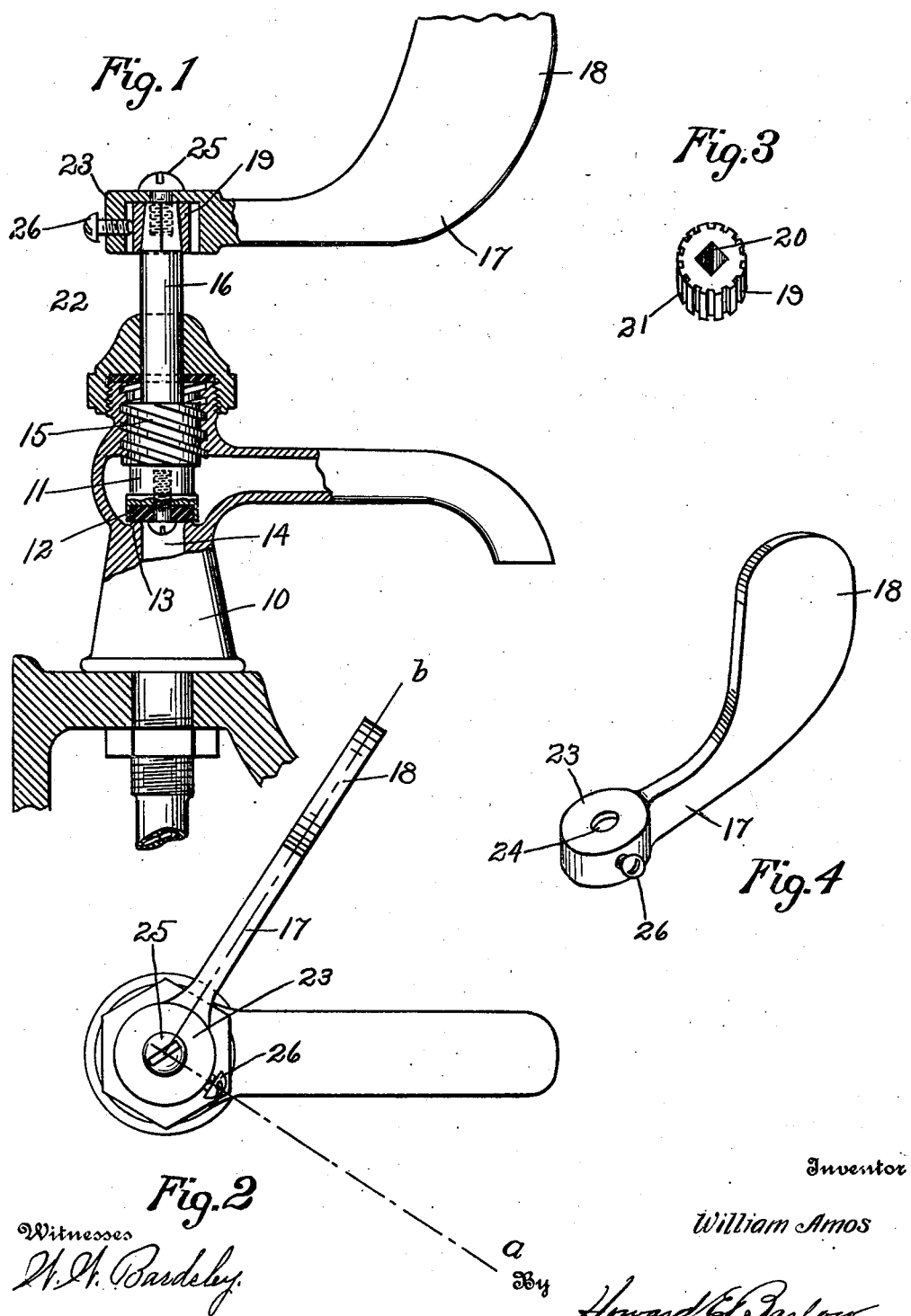

WILLIAM AMOS, OF PROVIDENCE, RHODE ISLAND.

FAUCET.

1,217,132. Specification of Letters Patent. Patented Feb. 27, 1917.

Application filed January 6, 1915. Serial No. 866.

*To all whom it may concern:*

Be it known that I, WILLIAM AMOS, a citizen of the United States, and resident of the city of Providence, in the county of Providence and State of Rhode Island, have invented certain new and useful Improvements in Faucets, of which the following is a specification.

This invention relates to faucets of the class designed more particularly for hospitals and doctors' offices to be used by surgeons and physicians when operations are being performed at which time the most sanitary conditions are demanded.
It is found in practice necessary before an operation, to wash the hands with a disinfectant soap or material while the water is running from the faucet, and after the hands have been so disinfected the faucet must not be touched by them to shut off the flow of water. Therefore, the object of this invention is to provide simple and effective means whereby the faucet may be closed by a movement of the surgeon's arm or elbow without touching the same with his hands. To accomplish this purpose, I have provided a lever adapted to be readily connected to the stem of any standard faucet in such a manner that the same may be readily adjusted radially on the stem and set in exactly the proper position to be most conveniently and advantageously engaged and operated by a movement of the arm.

The principal reason for requiring such adjustment in this operating handle is, that the packing on the valve is necessarily somewhat soft being made of vulcanized fiber or the like and a continued action of this packing against its seat, soon wears the former and permits the lever to rotate into a position other than that originally designed for it and, therefore, my invention contemplates an arrangement of mechanism, whereby this operating lever may be conveniently re-adjusted and again set in the exact position to be most advantageously operated by the arm of the physician.

With these and other objects in view, the invention consists of certain novel features of construction, as will be more fully described and particularly pointed out in the appended claims.

In the accompanying drawings:

Figure 1— is a side elevation of a faucet partly in section showing my lever and adjusting connections attached to the stem of the faucet valve.

Fig. 2— is a plan view of the faucet and valve operating lever indicating the movement of the latter from open to closed position.

Fig. 3— is a detail in perspective showing the corrugated independent hub which is adapted to be readily attached to any standard faucet stem.

Fig. 4— is a perspective view of my valve operating lever.

Referring to the drawings 10 designates a faucet in which is mounted the usual valve 11 having a packing 12 of vulcanized fiber or other suitable material attached to its lower end to engage the seat portion 13 of the faucet for the purpose of shutting off the supply of water through the inlet opening 14. This valve is provided with the usual threaded portion 15 by which it is raised from and returned to its seat by rotating the stem 16 through the medium of a suitable operating handle.

It is found in the practical use of water supplying faucets especially in hospitals and doctors' offices where a surgeon or physician is obliged to often use the water from a faucet in washing his hands with water and disinfectants before performing an operation, to mount on the valve stem 16 of the faucet a suitable lever 17 having its outwardly extending portion flattened and turned upward as at 18 so as to present a surface, which may be most readily engaged and operated by a movement of the arm.

In order to adjustably connect my improved form of lever to the stem of the valve I have found it advisable to provide a separate hub 19, see Figs. 1 and 3, which is shown as being provided with a square opening 20 formed through its center, whereby it is adapted to receive and readily fit onto the end of the standard faucet valve stems. The outer surface of this hub is preferably corrugated as at 21, see Fig. 3, or it may be provided with other suitable recesses or indentations for the reception of the end of the locking screw presently described.

In order to secure my improved form of lever to this independent hub portion I have formed a boss portion 23 on the lever in which is formed a socket or recess 22 adapted to receive and fit over the hub 19 and this boss portion is provided with an opening

24 in its top through which a binding screw 25 passes and is threaded into the end of the valve stem to hold the lever and this hub onto the stem.

In order to obtain an angular adjustment of the lever relative to the hub and to lock the lever in any desired position to the hub, I have provided a simple set screw 26 which may be threaded in the boss portion of the lever to have its end forced into these corrugations or recesses in the hub and so lock the two together.

In Fig. 2 the line *a* indicates the preferred open position of the lever and *b* the preferred closed position of the same, therefore, when the faucet is open it is only necessary to move the lever from *a* to *b* in order to close the same, which when the lever stands in the position indicated is most convenient for the operator, but when the valve packing wears as it is bound to do in every faucet, the lever instead of closing at the point *b* must be swung way beyond this point, which renders the operation of the valve awkward and inconvenient. Therefore, in order to correct this defect and restore the lever to its most advantageous operating position, it must be adjusted, and to accomplish this, I simply back out the set screw 26 and swing the lever around on its hub until it reaches the required position and then set up the screw and the whole is locked together as securely as before and adjusted in the position originally designed.

I claim:

1. An improvement in faucets comprising a casing provided with a valve seat, a valve stem working within said casing and provided with a valve coöperating with said seat, a removable hub carried by the upper end of said stem and rotatable therewith, and an operating lever having a boss inclosing said removable hub and adjustable angularly with respect to said hub, said lever having an outwardly extended flat plate, projecting upwardly a substantial distance above said hub and positioned to be engaged by the arm of the operator.

2. An improved faucet, comprising a casing provided with a valve seat, a valve stem working within said casing and provided with a valve coöperating with said seat, a hub removably attached to said stem and rotatable therewith, said hub being provided with peripheral serrations, a lever provided with a boss having a socket to receive said hub, said socket being closed at one end, a fastening device extending through the closed end of the boss to detachably connect said boss and stem, said lever having an outwardly extended flat plate projecting upwardly a substantial distance above said hub and positioned to be engaged by the arm of the operator, and a radially disposed set screw carried by said boss and positioned to selectively engage the peripheral serrations of said hub.

In testimony whereof I affix my signature in presence of two witnesses.

WILLIAM AMOS.

Witnesses:
HOWARD E. BARLOW,
A. F. MACREADY.